(12) United States Patent
Ganguly et al.

(10) Patent No.: US 7,221,313 B2
(45) Date of Patent: May 22, 2007

(54) GPS RECEIVER WITH CALIBRATOR

(75) Inventors: Suman Ganguly, Falls Church, VA (US); Aleksandar Jovancevic, Centerville, VA (US); Andrew Brown, Centerville, VA (US)

(73) Assignee: Center For Remote Sensing, Inc., Fairfax, VA (US)

( * ) Notice: Subject to any disclaimer, the term of this patent is extended or adjusted under 35 U.S.C. 154(b) by 0 days.

(21) Appl. No.: 11/453,565

(22) Filed: Jun. 15, 2006

(65) Prior Publication Data

US 2007/0008216 A1 Jan. 11, 2007

Related U.S. Application Data

(63) Continuation of application No. 11/175,008, filed on Jul. 5, 2005, now abandoned.

(51) Int. Cl.
*G01S 1/00* (2006.01)
(52) U.S. Cl. .................................. 342/357.02; 342/174
(58) Field of Classification Search ................ 342/165, 342/174, 357.02, 357.06, 442; 701/213, 701/215
See application file for complete search history.

(56) References Cited

OTHER PUBLICATIONS

Brown, A. et al. (2001) : *Ionospheric Correction Improvements for Single Frequency GPS Receivers*, ION 57th Annual Meeting, Albuquerque, New Mexico, Jun. 2001.
Brown, A. et al. (2004): *M-Code: Using Software Receiver*, ION/GNSS conference, Long Beach, California, Sep. 21-25, 2004.
Ganguly, S. et al. (2003): *Open Architecture development system for GPS and Galileo*, presented at the ION GPS 2005, Portland, Oregon, 2003.
"ICD-GPS-200", *the GPS Interface Document*. It is available from the U.S. Coast Guard's Civil GPS Service Information Center, (703) 313-5900.
Jovancevic, A. et al. (2003): *Real Time Dual Frequency Software Receiver*, presented at the ION GPS 2003, Portland, Oregon, 2003.
Kaplan, E.D. (ed.) (1996): *Understanding GPS: Principles and Applications*, Artech House Publishers, Norwood, Massachusetts, 1996.
Dafesh, P.A., et al. (2000): *Compatibility of the Interplex Modulation Method with C/A and P(Y) code Signals*, ION/GNSS conference, Salt Lake City, Utah, Sep. 19-22, 2000.
Dafesh, P.A. et al. Coherent Adaptive Subcarrier Modulation (CASM) for GPS Modernization.
"Real Time Simulation of GNSS" (Abstract); A. Brown, S. Ganguly, A. Jovancevice, D. Saxena, B. Sirpatil, Center for Remote Sensing, Inc.

*Primary Examiner*—Dao L. Phan
(74) *Attorney, Agent, or Firm*—Hoffman, Wasson & Gitler, PC

(57) ABSTRACT

Calibrating a receiver for a satellite positioning system. At preset intervals, a plurality of calibration signals are generated and applied to the receiver. The plurality of calibration signals correspond to a plurality of satellite signals, respectively, from the satellite positioning system. A relative time-delay bias from a delay estimation algorithm within the receiver. The time-delay bias is stored, preferably with the receiver. The receiver receives the plurality of satellite signals from the satellite positioning system. The plurality of satellite signals are processed with the time-delay bias. The processing reduces effects from the satellite receiver and improving estimate of the differential delay and total electron content (TEC).

18 Claims, 3 Drawing Sheets

GPS RECEIVER WITH CALIBRATOR

RELATED PATENT APPLICATION

This patent stems from a continuation application of U.S. patent application Ser. No. 11/175,008, and filing date of Jul. 5, 2005, now abandoned, entitled GPS RECEIVER WITH CALIBRATOR by inventors, Suman Ganguly, Aleksandar Jovancevic, and Andrew Brown. The benefit of the earlier filing date of the parent patent application is claimed for common subject matter pursuant to 35 U.S.C. § 120.

BACKGROUND OF THE INVENTION

The present invention relates to improving the accuracies of the satellite navigation receivers, such as those using the global positioning system (GPS), the Russian global orbiting navigational satellite system (GLONASS) and/or future Global Navigation Satellite (GNSS).

DESCRIPTION OF THE RELEVANT ART

In precision satellite positioning systems, the time delays between multiple frequencies, such as the L1 signal, L2 signal and L5 signal in GPS, are determined to account for the ionospheric delay. Receiver internal delays are of the order of a few nanoseconds and vary from receiver to receiver, and with time for a simple receiver. The variations and the dispersions of the signal different for different frequencies introduce significant errors in estimating the ionospheric delays, consequently affecting the overall accuracies of the satellite positioning system.

Global navigational satellite systems (GNSS) are known to include GPS and GLONASS and the Galileo systems. Several other systems covering different regions of the world are either available or planned, such as SBAS, EGNOS, WAAS, LAS, etc. GNSS-based navigational systems are used for navigation and positioning applications.

In the GPS navigational system, GPS receivers receive satellite positioning signals from a set of up to 32 satellites deployed in 12-hour orbits about earth and dispersed in six orbital planes at an altitude of 10,900 nautical miles. Each GPS satellite continuously transmits two-spread spectrum, L-band signals: an L1 signal having a frequency f1 of 1575.42 MHz, and an L2 signal having a frequency of f2 of 1227.6 MHz. The L1 signal from each satellite is modulated by two pseudo-random codes, the coarse acquisition (C/A) code and the P-code. The P-code is normally encrypted, with the encrypted version of the P-code referred to as the Y-code. The L2 signal from each satellite is modulated by the Y-code. The C/A code is available for non-military uses, while the P(Y) code is reserved for military uses.

Conventional GPS navigational systems determine positions by timing how long the coded ratio GPS signal takes to reach the receiver from a particular satellite, e.g., the travel time. The receiver generates a set of codes identical to those codes, e.g., the P(Y) code or the C/A-code, transmitted by the satellites. To calculate the travel time, the receiver determines how far to shift the receiver's own codes to match the codes transmitted by the satellites. The determined travel times for each satellite are multiplied by the speed of light to determine the distances from the satellites to the receiver.

By receiving GPS signals from four or more satellites in a satellite positioning system, a receiver can accurately determine its position in three dimensions, e.g., longitude, latitude, and altitude. A conventional GPS receiver typically utilizes the fourth satellite to accommodate a timing offset between the clocks in the receiver and the clocks in the satellites. The GPS signals also include a 50 bit per second data stream or data message that is superimposed on the C/A and P(Y) codes. Once the receiver has matched its code to the code in the GPS signal from a particular satellite, the receiver can decipher the data message. The data message can include navigational data related to the position of the satellite, including geometric dilution of precision (GDOP) parameters. Additionally, the data message can include accurate time data, ephemeris data, and data related to the health status of the satellite.

The GPS satellites utilize code division multiple access (CDMA) techniques so satellite signals do not interfere with each other. GLONASS navigational systems operate similarly to GPS navigational systems and utilize frequency division multiple access (FDMA) techniques so satellite signals do not interfere with each other. Other GNSS systems utilize principles very similar to those used in GPS.

The primary quantity measured by the GPS receiver is the time delay between the satellite and the receiver. This delay can be expressed as the free space distance between the transmitter and the receiver, by using the speed of light as the free space velocity. The equivalent free space distance is called pseudo range. These pseudo ranges are measured for 4 or more satellites and a navigational solution is obtained to estimate the receiver position.

The time delay between the satellite and the receiver is affected by the presence of the ionosphere and troposphere. Since the time delay through ionized plasma is inversely proportional to frequency squared $f^2$, multiple frequency observations, with the L1 signal and L2 signal, are used to determine the ionospheric delay. This will be enhanced with the availability of another frequency L5 in the GPS system. The ionospheric delay is significant and if uncompensated, can lead to position errors of the order of several tens of meters.

Since the L1 signal and L2 signal are processed through separate front-ends at the receiver, they suffer different delays through the circuits. The relative delay between the two signals may also vary with time, temperature, aging, voltage variations etc. For precision results, these relative delays should be monitored/calibrated regularly and estimated as receiver bias.

SUMMARY OF THE INVENTION

A general object of the invention is to improve accuracy of satellite navigational systems.

According to the present invention, as embodied and broadly described herein, a calibrator and method for calibrating a receiver for a satellite positioning system, is provided. The satellite positioning system would be, by way of example, the global positioning system (GPS), the Russian global orbiting navigational satellite system (GLONASS) and/or future satellite positioning systems, such as the Galileo system. While the invention is taught, by way of example, with the GPS, the invention applies and covers other satellite positioning systems.

The invention incorporates a built in calibrator that simulates satellite signals at the receiver for both, or all, the frequencies, of the L1 signal, L2 signal and future L5 signal. The simulated satellite signals do not introduce any relative delay between frequencies. The simulated satellite are thus used as calibration sources to estimate the receiver biases at frequent intervals.

At preset intervals, the calibrator and method of the invention comprise the steps of generating a plurality of calibration signals and applying the plurality of calibration signals to the receiver. The plurality of calibration signals correspond to a plurality of satellite signals, respectively, used by the satellite positioning system. The plurality of calibration signals can be a replica of the plurality of satellite signals, or can be a unique calibration signal. The choice of the calibration signal depends on the type of dispersion in the receiver chain.

The method determines, at the receiver, responsive to the plurality of calibration signals, an effective time delay, including dispersion, bias from an estimation algorithm within the receiver. The bias is stored, preferably with the receiver.

The receiver receives the plurality of satellite signals from the satellite positioning system. The plurality of satellite signals are processed with the bias algorithm. The time delay estimation using the code correlation technique is generally noisy and the carrier phase based smoothing is used in many receivers. This is particularly useful for the estimation of ionospheric content (TEC), where the cleaner phase signals are normalized with the noisier code outputs to derive relating accurate TEC estimation. Un-calibrated bias introduces errors in TEC estimation. The processing is so to reduce ionospheric effects on the receiver and improving estimate of the TEC during normal operation.

Using the bias estimation algorithm, the method determines the relative time delay utilizing a combination of a plurality of pseudo-range and carries phases from the plurality of calibration signals, respectively, with differences between the plurality of pseudo-ranges for determining the delay.

There are various ways to ensure that the calibration signals at the two frequencies have a known delay between them.

The digital outputs of the signals at L1 and L2 will have precisely known and deterministic delays between them. Unknown delays generally occurs in the analog circuits present after the Digital to Analog Conversion (DAC). In the current implementation, these DAC outputs represent some Intermediate Frequency (IF). With high speed DAC's, in conjunction with high speed processor, one could convert these signals directly to the L1 and L2 frequencies. In our implementation, low speed DACs are used and the IF signals are upconverted to L1 and L2 bands. Conventionally, the upconversion involves filters to limit the sidebands and harmonies etc. However, these cause significant delays and the filters at L1 and L2 may not be identical or their differential delays may vary with time and aging etc. Our innovation consists in elimination of these filters from conventional upconverters. The spurious signals are filtered by the receiver filters. This ensures that the signals of concern e.g. the calibration signals at L1 and L2 appear with zero or known (determined by the digital circuits) differential delays between them. This provides a stable calibration source. This method of generating the calibration signals with precisely controlled phase relationships between the plurality of signals can be used in many other applications requiring precise monitoring, controlling and calibration of phase relationships between multiple signals.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
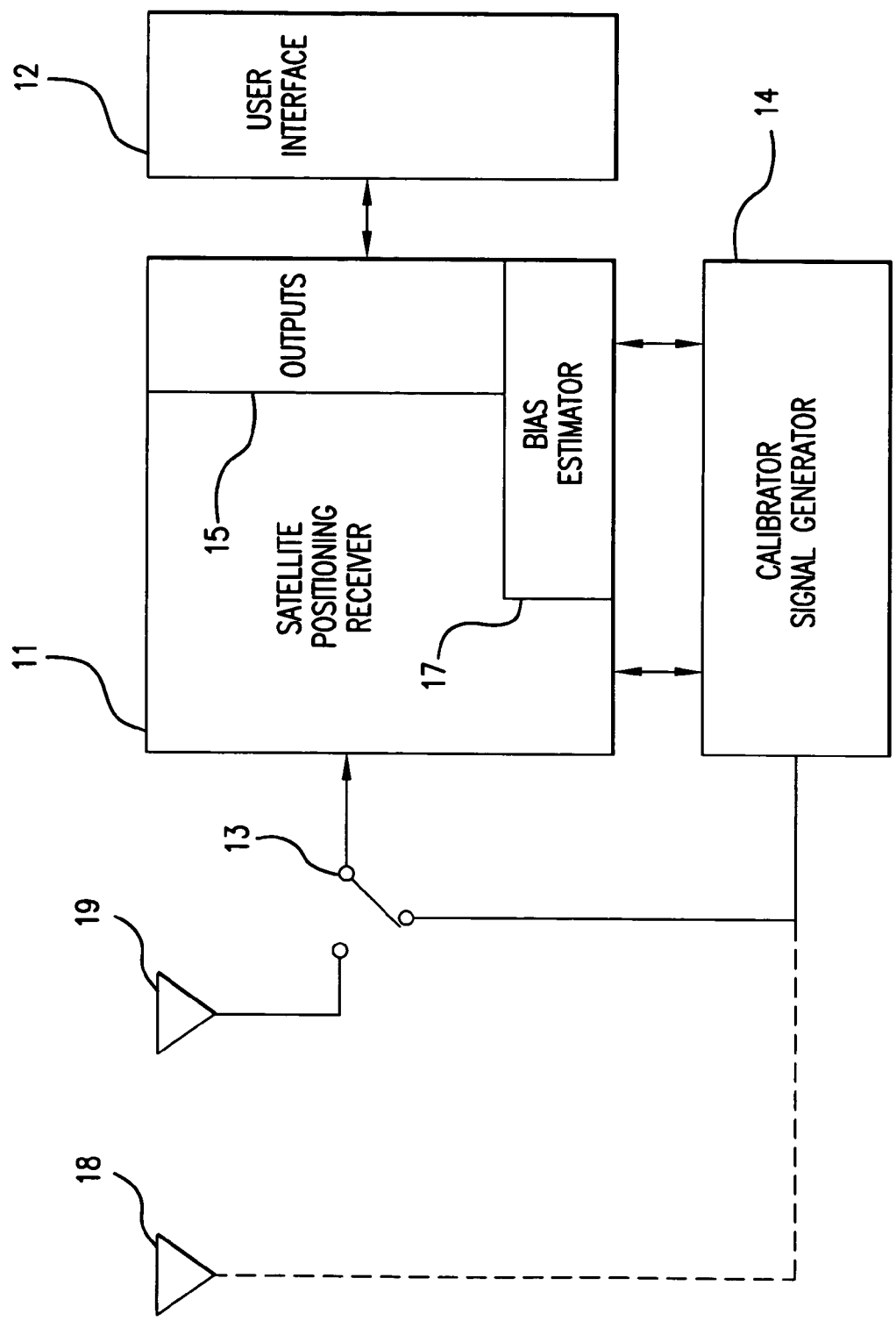
FIG. 1 illustrates a GPS receiver with built in calibrator.

Reference now is made in detail to the present preferred embodiments of the invention, examples of which are illustrated in the accompanying drawings, wherein like reference numerals indicate like elements throughout the several views.

In the exemplary arrangement shown in FIG. 1, an improvement for calibrating a receiver 11 for a satellite positioning system, is shown. The satellite positioning system may be, for example, the global positioning system (GPS), the Russian global orbiting navigational satellite system (GLONASS) and/or future satellite positioning systems, such as the Galileo system and/or any other GNSS system.

The present invention incorporates replicas of synthetically generated calibration signals, at multiple frequencies, which are introduced at the input of the receiver 11. The corresponding relative delays measured by the receiver are thus determined as the receiver bias. For ionospheric estimation, for example, the calibration signal can have no ionospheric delays and the receiver processed output of TEC would represent the calibration error for TEC estimation. This principle can be used for generalized calibration of the system.

This invention improves the ionospheric and tropospheric observations using multiple frequency GPS or other navigational satellite positioning systems. This consequently improves the accuracies of the GPS receivers for precision applications.

At preset intervals, or users discretion, the improvement generates with calibrator-signal generator 14 a plurality of calibration signals, corresponding to a plurality of satellite signals, respectively, used by the satellite positioning system. The plurality of calibration signals are a replica of the plurality of satellite signals, respectively. A calibration signal typically is a simulated-satellite signal or a synthetically generated satellite signal. For the GPS, the plurality of calibration signals correspond to the plurality of satellite signals having L1 signal at 1575.42 MHz and L2 signal at 1227.6 MHz.

The plurality of calibration signals are generated by calibration-signal generator 14 and are applied to the receiver 11 by transmitting through antenna 18 the plurality of calibration signals. Although the calibration signals can be generated in many ways and the present invention is applicable with any calibrators, one method of generating calibration signal at two frequencies without the effect of the analog filters, ensuring minimum and stable differential delays between the two frequencies. The receiver 11 receives the plurality of calibration signals from antenna 19. Alternatively, an input of the receiver 11 may be switched by switch 13 to the calibration-signal generator 14 which generates the plurality of calibration signals.

In response to the plurality of calibration signals, the receiver 11 determines a time-delay bias by bias estimator 17 from a delay estimation algorithm. The delay estimation algorithm is well-known in the art, and could be the normal total electron content (TEC) algorithm.

The time-delay bias is stored in receiver 11.

The plurality of satellite signals are received with the receiver 11 from the satellite positioning system.

The plurality of satellite signals are processed with the time-delay bias, thereby reducing effects from the satellite receiver and improving estimate of the ionospheric delay. The improvement further includes the step of determining, at the receiver, using the time-delay estimation algorithm, the relative time delay between the received signals utilizing a combination of a plurality of pseudo-range and carries phases from the plurality of satellite signals, respectively, with differences between the plurality of pseudo-ranges for determining time delay. Outputs 15 of receiver 11 send data to user interface 12.

In the receiver 11, first correlator CORR1 and second correlator CORR2, which are programmed to receive the L1 signal and the L2 signal of the GPS, can be implemented in the same correlator in and FPGA, ASIC, software or other implementation. As explained before, it is necessary to ensure that the calibrator signals are provided with known differential delay between them and this can be accomplished in many ways. We described an implementation where the Digital Signals are converted to some Intermediate Frequency and then upconverted without any filtering. This ensures constancy of the differential delay between L1 and L2.

Calibration signals can be injected anywhere before the receiver 11. If authorized, the calibration signals can be radiated or coupled with the receiving antennas 18 to calibrate the receiving antennas 19.

The invention can be extended to other frequencies such as for the L5 signal and constellation such as Galileo, and GLONASS.

The calibrator 14 does not produce any time varying differential delay between L1 signal and L2 signal. Residual delay is fixed and determined before hand. This is added to the measured bias.

FIG. 1 describes the overall scheme showing the dual frequency GPS receiver and the calibrator sections. The calibration signal can be applied at the input of the receiver by switch 13 in position 2. The calibrator signal may also be applied at the antenna 19, LNA or can be radiated by antenna 18 if permitted. The calibrator signal is a replica of GPS signal without the ionospheric and tropospheric models and the pseud oranges for both the L1 signal and L2 signal should be ideally the same.

Time-delay estimation algorithm inside the receiver 11 utilizes a combination of pseudo range and carrier phases. Carrier phases are used to provide smoother and more accurate representation of the pseudo-ranges. The difference between the pseudo ranges of the L1 signal and the L2 signal are used to determine the time delay.

When using the calibrator, residual bias will be reflected in the estimated tie delay. This is residual time delay determined in switch position 2 can be stored in the receiver and used for subsequent processing as the receiver bias. This will provide a precise estimate of ionospheric correction and the effects of receiver hardware are eliminated.

Figure 2:
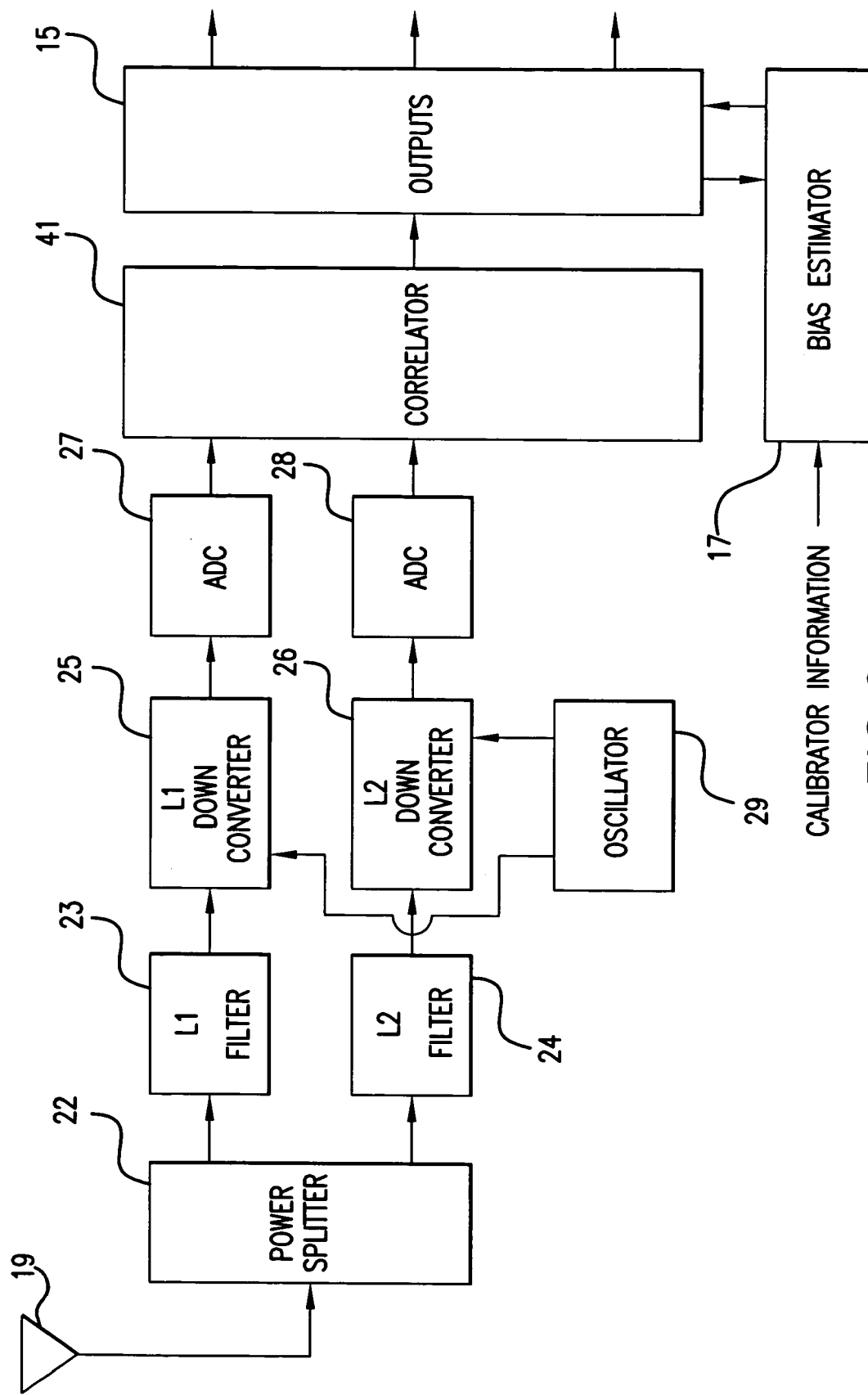
FIG. 2 shows a schematics of GPS receiver portion.

FIG. 2 describes the GPS receiver architecture implemented using real-time software. The plurality of satellite signals are received by antenna 19, power split through power splitter 22, and filtered by L1 filter 23 and L2 filter, respectively. The L1 down converter 25 uses a signal from local oscillator 29 to shift the L1 signal to a processing frequency, and using analog-to-digital converter 27 digitizes down converted signals. The L2 down converter 26 uses a signal from local oscillator 29 to shift the L2 signal to a processing frequency, and using analog-to-digital converter 28 digitizes down converted signals. Subsequent processing are performed digitally. Computationally intensive portions such as code generation, correlation by correlator 41 are implemented in Field Programmable Gate Array (FPGA), See Jovancevic et al. 2003, and the relatively slower processing are implemented in microprocessor or Digital Signal Processors. Navigational Solutions are obtained in this block.

With the calibrator on, the time delay estimates obtained in the Navigational Solutions are the receiver biases. These are determined and stored in the bias estimator. Whether the calibrator is on or off, the information is provided to the bias estimator either manually or by automated software.

Figure 3:
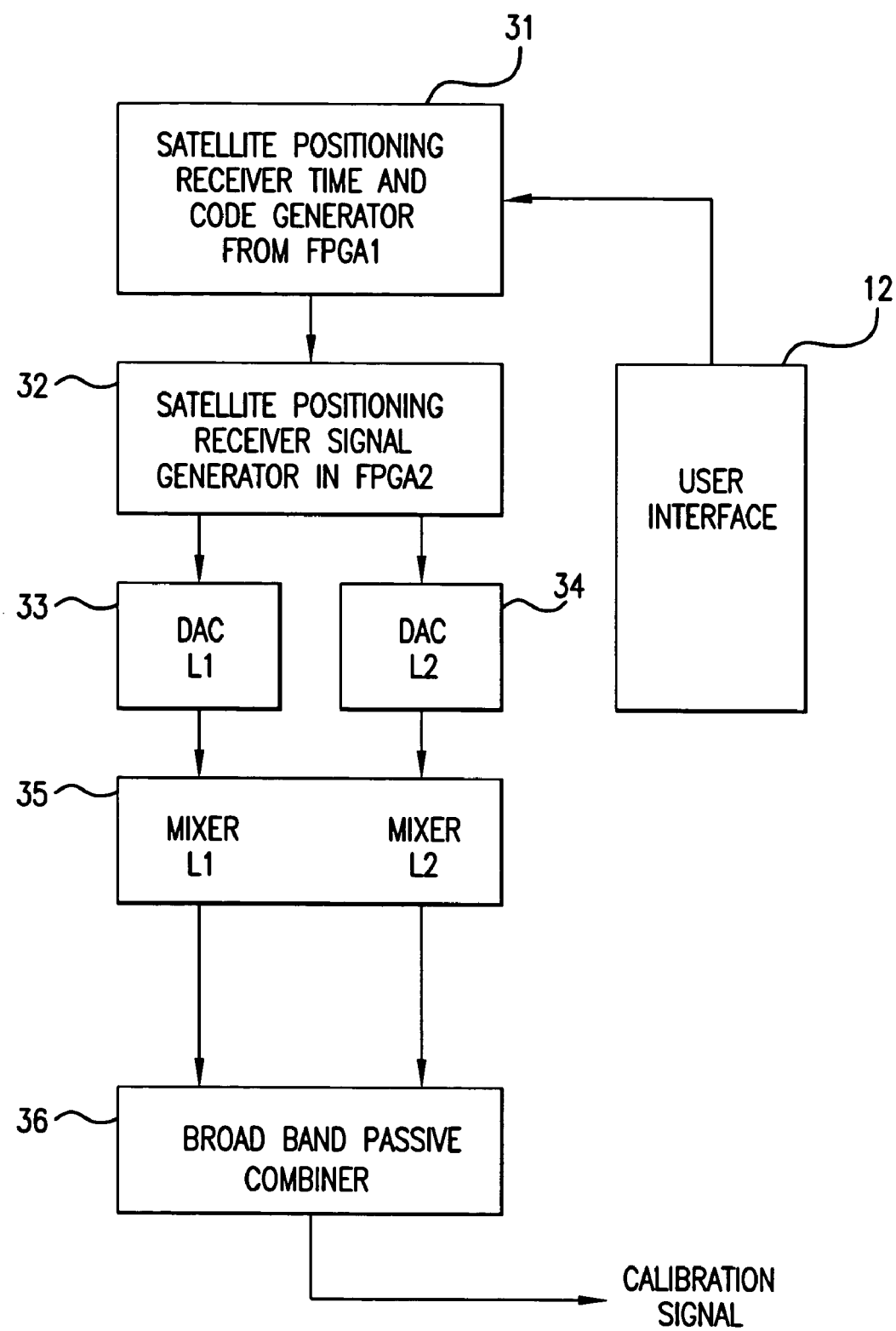
FIG. 3 is a schematic of the calibrator.

Schematics of the calibrator are shown in FIG. 3. GPS time and GPS codes generators 31, 32 are available in the first correlator CORR1 shown in FIG. 2. Second correlator CORR2, which ideally is the same physical field programmable gate array FPGA, takes the code generators 31, 32 and generates the GPS waveform for a given time, given satellite and for any given location. The GPS waveform samples are generated in the first and second correlators CORR1 CORR2 and are converted to analog intermediate frequency (IF) signals using digital-to-analog converter (DAC) L1 33 and DAC L2 34. Passive mixers 35 are used for up-conversion to L1 and L2 bands. The reference local oscillator signal is available from the GPS down-converter. The mixer outputs are combined using broadband passive combiner 36 and the resulting composite L1 and L2 signals are available as calibration signal.

The signal generation in the DAC's 33, 34 are performed with high fidelity without any differential delay between the L1 and L2 signals. All the components, e.g. mixers 35, and broadband combiners 36 are extremely stable devices in terms of aging, voltage fluctuations and temperatures. There are no active components or narrowband filters that could introduce any significant differential delay. Any differential delay between the two channels for the L1 signal and the L2 signal, is caused by differential delays between the signal traces (wave lengths) after the DAC's 33, 34 and up to the broadband-passive combiner 36. These traces could be drawn relatively short and symmetrical to minimize these delays. The effective delays are also affected by the dispersion of the signal across the band and different dispersion manifest in different delays. The delay and dispersion are function of the dielectric material, active devices, etc. and the calibration procedure accounts for all these effects. Also, since these delays are time invariant, they can be calibrated out.

Use of passive mixers without the filter for up-conversion is unusual and will introduce many spectral components, sidebands, separated by some harmonics combinatorial frequencies determined by the Local oscillator frequency and the sampling frequency used for DAC's 33, 34. These combinations should be chosen to provide the first sidebands to be reasonably away from the main GPS signals, e.g. the L1 signal and L2 signal. The filters in the GPS receiver circuitry will eliminate them.

The invention can be extended to other frequencies, L5 or other systems. With the calibration device, one can use a precise clock source to estimate the error in satellite clock and satellite bias.

The calibration system introduces minimum delay (and differential delays between two similar channels) from the accurate digital generation to analog output(s). The calibration system utilizes digital to analog conversion of the digitized samples, generated in the computational process, of the baseband or suitable intermediate frequency (IF). This is often necessary because the D/A converters generally do not provide enough dynamic range as the frequency is increased and the baseband or IF generation of the samples are used. These IF signals, however, must be translated to the desired RF frequencies. This is generally, conventionally, performed using up-conversion using coherent local oscillators and mixers. The outputs of the mixers are filtered and the desired radio frequency (RF) is provided. The filters, however, produce significant delays and in multiple outputs the differential delays may also be increased. Our innovation consists in elimination of the filters and reducing the inherent delays. This also reduces chances of differential delays caused by unequal filters, aging, temperature etc. This calibration system may be utilized in other systems as well.

It will be apparent to those skilled in the art that various modifications can be made to the GPS receiver with the calibrator of the instant invention without departing from the scope or spirit of the invention, and it is intended that the present invention cover modifications and variations of the GPS receiver with the calibrator provided they come within the scope of the appended claims and their equivalents.

REFERENCES

Brown, A. et al. (2001): *Ionospheric Correction Improvements for Single Frequency GPS Receivers*, ION 57th Annual Meeting, Albuquerque, N. Mex., June 2001.

Brown, A. et al. (2004): *M-Code: Using Software Receiver*, ION/GNSS conference, Long Beach, Calif., 21–25 Sep. 2004.

Brown, A. et al. (2004): *Real Time Simulation of GNSS*, ION/GNSS conference, Long Beach, Calif., 21–25 Sep. 2004.

Ganguly, S. et al. (2003): *Open Architecture development system for GPS and Galileo*, presented at the ION GPS 2003, Portland, Oreg., 2003.

"ICD-GPS-200", *the GPS Interface Document*. It is available from the U.S. Coast Guard's Civil GPS Service Information Center, (703) 313-5900.

Jovancevic, A. et al. (2003): *Real Time Dual Frequency Software Receiver*, presented at the ION GPS 2003, Portland, Oreg., 2003.

Kaplan, E. D. (ed.) (1996): *Understanding GPS: Principles and Applications*, Artech House Publishers, Norwood, Mass., 1996.

We claim:

1. A method for calibrating a receiver for a satellite positioning system, comprising, at preset intervals, the steps of:
generating, from a signal generator located at the receiver, a plurality of calibration signals, and/or equivalent timing signals, corresponding to a plurality of satellite signals, respectively;
applying the plurality of calibration signals to the receiver;
determining, at the receiver, responsive to the plurality of calibration or timing signals, a phase difference, or time delay, between two frequencies with a relative time-delay, and/or phase shift, bias from a delay estimation algorithm within the receiver;
storing the time-delay bias;
receiving, with the receiver, the plurality of satellite signals from the satellite positioning system; and
processing the plurality of satellite signals with the time-delay bias, thereby reducing effects from the satellite receiver and improving estimate of the delays and total electron content (TEC).

2. The method as set forth in claim 1, with the step of applying including the step of transmitting, from the signal generator located at the receiver, the plurality of calibration signals; and
receiving, with the receiver, the plurality of calibration signals.

3. The method as set forth in claim 1, with the step of applying including the step of switching an input of the receiver to a source of the plurality of calibration signals.

4. The method as set forth in claim 1, with the step of generating the plurality of calibration signals including generating the plurality of calibration signals as a replica of the plurality of satellite signals, respectively.

5. The method as set forth in claim 1, further including the step of determining, at the receiver, using the delay estimation algorithm, a relative time delay utilizing a combination of a plurality of pseudo-range and carries phases from the plurality of satellite signals, respectively, with differences between the plurality of pseudo-ranges for determining the relative time delay.

6. The method as set forth in claim 1, with the step of generating including the step of generating the plurality of calibration signals, corresponding to the plurality of satellite signals having L1 signal at 1575.42 MHz and L2 signal at 1227.6 MHz for GPS, and/or at 1176.45 MHz for L5 signal or for other frequencies for other systems.

7. The method as set forth in claim 6, with the step of generating further including the step of generating, from the signal generator located at the receiver, the plurality of calibration signals, corresponding to the plurality of satellite signals having L1 signal.

8. The method as set forth in claim 6, with the step of generating further including the step of generating a precise clock source to estimate an error in satellite clock and satellite bias.

9. An improvement for calibrating a receiver for a satellite positioning system, comprising:
a calibrator, located at the receiver, for generating at preset intervals, a plurality of calibration signals, and/or equivalent timing signals, corresponding to a plurality of satellite signals, respectively;
said calibrator for applying the plurality of calibration signals to the receiver;
said receiver, responsive to the plurality of calibration or timing signals, for determining a phase difference between two frequencies with a relative time-delay bias from a delay estimation algorithm within the receiver, and storing the time-delay bias;
said receiver for receiving the plurality of satellite signals from the satellite positioning system; and
a processor for processing the plurality of satellite signals with the time-delay bias, thereby reducing effects from the satellite receiver and improving estimate of the delays and total electron content (TEC).

10. The improvement as set forth in claim 9, with:
said calibrator for transmitting the plurality of calibration signals; and said receiver for receiving the plurality of calibration signals.

11. The improvement as set forth in claim 9, with said calibrator for switching an input of the receiver to a source of the plurality of calibration signals.

12. The improvement as set forth in claim 9, with said calibrator for generating the plurality of calibration signals as a replica of the plurality of satellite signals, respectively.

13. The improvement as set forth in claim 9, with said receiver, using the delay estimation algorithm, for determining a relative time delay utilizing a combination of a plurality of pseudo-range and carries phases from the plurality of satellite signals, respectively, with differences between the plurality of pseudo-ranges for determining the relative time delay.

14. The improvement as set forth in claim 9, with said calibrator for generating the plurality of calibration signals, corresponding to the plurality of satellite signals having L1 signal at 1575.42 MHz and L2 signal at 1227.6 MHz for GPS, and/or at 1176.45 MHz for L5 signal or for other frequencies for other systems.

15. The improvement as set forth in claim 14, with said calibrator for generating the plurality of calibration signals, corresponding to the plurality of satellite signals having L1 signal.

16. The improvement as set forth in claim 9, with said calibrator for generating a precise clock source to estimate an error in satellite clock and satellite bias.

17. The improvement as set forth in claim 9, with the calibrator further including:
   a digital to analog converter for converting a plurality of digitized signals generated in a computational process of a baseband or suitable intermediate frequency (IF) to a plurality of analog signals, respectively; and
   an up-converter for converting the plurality of analog signal to a desired radio frequency (RF) thereby generating the plurality of calibration signals.

18. The improvement as set forth in claim 9, with the calibrator for generating of plurality of signals with precisely controlled phase relationships between them, irrespective of use of the plurality of signals in GPS receivers, GPS simulators or other devices requiring monitoring, controlling and calibrating the plurality of signals with precision phase relationships between the plurality of signals.

* * * * *